(12) United States Patent
Nishihara

(10) Patent No.: US 7,571,282 B2
(45) Date of Patent: *Aug. 4, 2009

(54) COMPUTER SYSTEM HAVING A FLASH MEMORY STORAGE DEVICE

(75) Inventor: Toshiyuki Nishihara, Kanagawa (JP)

(73) Assignee: Sony Corporation (JP)

( * ) Notice: Subject to any disclaimer, the term of this patent is extended or adjusted under 35 U.S.C. 154(b) by 273 days.

This patent is subject to a terminal disclaimer.

(21) Appl. No.: 11/493,658

(22) Filed: Jul. 27, 2006

(65) Prior Publication Data

US 2007/0028034 A1   Feb. 1, 2007

(30) Foreign Application Priority Data

Jul. 29, 2005   (JP)   ............... 2005-220940

(51) Int. Cl.
*G06F 13/00* (2006.01)
(52) U.S. Cl. ............... 711/118; 711/128; 711/153
(58) Field of Classification Search ............... 711/103, 711/118, 128, 153
See application file for complete search history.

(56) References Cited

U.S. PATENT DOCUMENTS

| | | | |
|---|---|---|---|
| 4,873,664 A | | 10/1989 | Eaton, Jr. |
| 6,263,398 B1 * | | 7/2001 | Taylor et al. ............... 711/3 |
| 2003/0076719 A1 * | | 4/2003 | Byeon et al. ............... 365/200 |
| 2003/0214853 A1 * | | 11/2003 | Hosono et al. ............... 365/200 |
| 2005/0005057 A1 * | | 1/2005 | Wang ............... 711/103 |
| 2007/0028035 A1 * | | 2/2007 | Nishihara ............... 711/103 |
| 2007/0091679 A1 * | | 4/2007 | Nishihara et al. ............... 365/185.11 |

FOREIGN PATENT DOCUMENTS

| | | |
|---|---|---|
| JP | 05-216775 A | 8/1993 |
| JP | 06-349286 A | 12/1994 |

OTHER PUBLICATIONS

Hiroshi Nakamura et al., "A 125mm$^2$ 1Gb NAND Flash Memory with 10MB/s Program Throughput", ISSC 2002, Session 6, SRAM and Non-Volatile Memories, 6.4, 2002 IEEE International Solid-State Circuits Conference (2002).

Stefan Lai et al., "OUM—A 180nm Nonvolatile Memory Cell Element Technology For Stand Alone and Embedded Applications", IEDM-01, pp. 803-806 (2001).

W. W. Zhuang et al., "Novell Colossal Magnetoresistive Thin Film Nonvolatile Resistance Random Access Memory (RRAM)", IEDM, pp. 193-196 (2002).

Roy Scheuerlein et al., "A 10ns Read and Write Non-Volatile Memory Array Using a Magnetic Tunnel Junction and FET Switch in each Cell", TA 7.2, 2000 IEEE International Solid-State Circuits Conference (2000).

* cited by examiner

*Primary Examiner*—Reba I Elmore
(74) *Attorney, Agent, or Firm*—Rader Fishman & Grauer PLLC; Ronald P. Kananen

(57) ABSTRACT

A computer system is provided, wherein a storage device having a flash memory as the main medium is given a cache memory with a high hit rate even in a small capacity and less access overheads, high-speed writing to the flash memory is attained, and the number of rewriting is reduced: wherein a processing device, a cache memory and a flash memory for data via the cache memory to be written in response to a request from the processing device are provided; and a line size of an entry to the cache memory is 1/N (note that N is 2 or larger integer) of an actual page size as a writing unit of the flash memory.

15 Claims, 8 Drawing Sheets

COMPUTER SYSTEM HAVING A FLASH MEMORY STORAGE DEVICE

CROSS REFERENCES TO RELATED APPLICATIONS

The present invention contains subject matter related to Japanese Patent Application No. 2005-220940 Region in the Japanese Patent Office on Jul. 29, 2005, the entire contents of which being incorporated herein by reference.

BACKGROUND OF THE INVENTION

1. Field of the Invention

The present invention relates to a computer system using a flash memory as its storage device, and particularly relates to speedup of data transfer in the storage device.

2. Description of the Related Art

In recent years, as a storage medium of a digital still camera or mobile computer device, attention is paid to a flash memory.

A flash memory is a semiconductor memory using tunneling or hot electron acceleration to make electrons pass through a gate insulation film and injecting them into a floating gate or trap layer to make a threshold value of a cell transistor change and thereby make it store data. A memory cell can be configured by just one transistor using a stacked gate structure, an MNOS 9 (metal-silicon nitride-silicon dioxide-silicon) structure, etc., therefore a cheap and large capacity memory can be realized. As a representative example, a NAND (Not And) type flash memory can be explained.

FIG. 1 is a diagram of an example of the internal configuration of a NAND type flash memory. The NAND type flash memory of FIG. 1 has a plurality of memory units 1-1 to 1-$n$ connected to bit lines BL1 to BLn arranged in an array (vertically and laterally).

For example, the gate of a selection transistor 2 is connected to a selection gate line SL1, and gates of selection transistors 3 are connected to a selection gate line SL2. Further, gates of memory cells N0 to N15 are connected to word lines WL0 to WL15.

The memory cells N0 to N15 have stacked gate structures and store data according to charge accumulation in the floating gates. Namely, when many electrons are accumulated in the floating gates, the threshold values of the transistors rise, therefore the presence of current passing through the memory units 1 (-1 to -n) from the charged bit lines BL1 to BLn is detected by an access circuit 4 including a sense amplifier etc. to determine the data.

Such a NAND type flash memory does not require that a contact region be provided to the bit line for each memory cell, therefore is suitable for a medium of a particularly large capacity and cheap storage device.

In general, the programming speed of a flash memory is very slow. Several hundred microseconds are taken per cell. Further, overwriting of data is not possible, therefore it is necessary to erase data before the programming. A time of as long as several microseconds is taken for this. This problem is treated by processing many memory cells in parallel.

Namely, by simultaneously writing data in a group of memory cells 5 connected to for example the same word line WL0 and forming a page unit and further erasing a cell block 6 configured by the groups of pages sharing the memory unit, a transfer speed of the program is improved.

Specifically, a 1 Gb NAND type flash memory is described in for example *ISSCC* 2002 *Preprints*, p. 106, Session 6.4. The page size is set to 2 kBytes, and the erase block size is set to 128 kB. Namely, by erasing a group of memory cells of 128 kBytes in parallel in one memory array and programming the memory cells there for each 2 kBytes in parallel, a program transfer speed of 10 MB/s is realized.

SUMMARY OF THE INVENTION

In recent years, in order to solve the problems of hard disks such as the magnitude of power consumption, the length of the seek time, the shock resistance, portability, etc., their replacement by flash memories is being anticipated.

However, as explained above, a flash memory has a disadvantage that an increase of speed may be impossible to achieve unless the access unit is made large. Further, data cannot be overwritten, therefore erasure is necessary for rewriting, and an erase block at that time is further larger.

The erase unit being tens of times larger than the access unit in this way is a general specification in a flash memory having a long erasing time and suffering from disturbances in unselected cells at the time of writing. However, the write efficiency is remarkably degraded due to this.

For example, assume that a storage device for replacing a hard disk is configured by using a flash memory of a transfer speed of 10 MB/s using block erasing in units of 128 kB. When desiring to raise the transfer speed up to the 160 MB/s targeted for high speed storage by a serial ATA connection, it is necessary to employ a multi-bank or multi-chip configuration and make for example 16 memory arrays operate in parallel.

FIG. 2 is a conceptual view of a flash memory configuring such a storage device.

In FIG. 2, in order to realize high speed transfer, 16 arrays AR0 to AR15 are simultaneously operated. In this case, at the time of writing data, for example pages P0 to P1 are simultaneously written, while at the time of the erasing data, blocks B0 to B15 are simultaneously erased. At this time, the actual page region 24 forming one write unit reaches 32 kB, and the actual erase block region 21 forming one erase unit reaches 2 MB.

On the other hand, in an ordinary file system, the cluster size forming the minimum write unit is about 4 kB, and random access is carried out in this unit. In that case, a request for rewriting for example only pages P0 and P1 is generated.

However, when such access is carried out by the above device, it is necessary to erase the entire actual erase block region 21. If there is a valid file in the unselected region in that, it is necessary to protect it from erasure. A typical example of coping with that is as follows.

1. First, the data of the entire actual erase block region 21 is read out from the flash memory to a memory region 22 of a separately provided buffer memory 23.

2. Next, the data corresponding to the pages P0 and P1 is updated in the memory region 22.

3. Next, the block region 21 in the flash memory is erased.

4. Finally, all of the updated block data of the memory region 22 is written back to the erased region 21 described above.

Namely, for writing 4 kBytes, erasure and the reading and writing of 2 MB of data become necessary in actuality.

Specifically, reading and writing of data in an amount of one page respectively take 200 μs and erasing of a block takes 2 ms, so that it takes nearly 30 ms.

On the other hand, there is a method of preparing an auxiliary block region 27 already subjected to erasing in advance and combining the block region 27 with original data of the block region 21 and updated data of the pages P0 and P1 to perform writing, as well.

In this case, a virtual address configuration is used for updating correspondence of logic addresses and physical addresses in units of an erase block, and a physical block corresponding to a logic address to be accessed is shifted from the original erase block region 21 to a data moving destination block region 27.

In this case, however, it is necessary to perform an operation of storing valid data from the erase block region 21 to the moving destination block region 27. Also, in this case, normally, an original block region 21 is erased to be an auxiliary block. Therefore, almost the same reading, writing and erasing are finally performed, so that the all the same large overhead arises.

When actually updating a file, not only the file but the management region, log description and other related plurality of small regions are normally updated at the same time. Furthermore, there are some cases that the file itself is fragmented to a plurality of small regions.

Accordingly, when there is a limitation as above, actual transfer performance becomes remarkably low.

Although rewriting of 4 kB was the case in the above example, a normal file storage device, such as a hard disk, supports rewriting in furthermore smaller units of 512 bytes.

However, how small the unit of rewriting is, entire erase block as above is performed.

Under such circumstances, a current storage device using a flash memory has attained far lower transfer performance than that of a hard disk particularly when writing. Furthermore, the redundancy as above not only simply deteriorates the transfer performance, but also increases the number of erasing times of the flash memory so as to deteriorate the lifetime.

To deal with the disadvantages as above, for example, the Japanese Unexamined Patent Publication No. 05-216775 and the Japanese Unexamined Patent Publication No. 06-349286 disclose use of a cache memory.

Examples described here are to store in a cache memory block data as an erasing unit of a flash memory or page data as a simultaneous writing unit as it is as an entry. When a block including data to be updated is stored in a cache, that is, when a cache hits, only data in the cache is updated, so that the redundant operation as above is not immediately caused.

However, as explained above, when attaining speedup in a flash memory by increasing the number of parallel processing, the page size also becomes only enormous.

For example, in the case in FIG. 2 explained above, 16 arrays operate in parallel to attain a transfer speed of 160 MB/s, which is 16 times as fast as that in normal cases, consequently, the actual page size uses 32 kB. The erase block size reaches as large as 2 MB.

Accordingly, for example, even when using 512-kB cache memory, only 16 entries are obtained in an actual page unit and even only one entry is not secured in units of a block. There were disadvantages that the number of entries is not secured unless the cache size is made enormous as the performance improves, and a sufficient hit rate is not obtained.

It is desired to provide a computer system, in which a cache memory having a high hit rate even in a small capacity and less overhead in accessing is given to a storage device using a flash memory as its main medium, writing to the flash memory becomes high in speed and the number of rewriting times is reduced.

According to a first aspect of an embodiment of the present invention, there is provided a computer system, having: a processing device; a cache memory; and a flash memory for data via the cache memory to be written in response to a request from the processing device; wherein a line size of an entry to the cache memory is 1/N (note that N is 2 or larger integer) of an actual page size as a collective writing unit of the flash memory.

Preferably, the system further includes a page buffer storing data of an actual page; wherein when writing to the flash memory data of an entry to the cache memory, an entry part in the cache memory and a non-entry part in the flash memory in actual page data corresponding to the entry are combined in the page buffer and written to the flash memory after the combining.

Preferably, the cache memory has a set associative structure, and the number of sets is N or an integral multiple of N.

Preferably, the system has a function part writing back at least two of entries at a time to the flash memory when there are a plurality of entries corresponding to different regions on the same actual page in the cache memory.

Preferably, the flash memory is written back of actual page data performed by adding updated page data to a region subjected to erasing and invalidating an original page field.

According to a second aspect of an embodiment of the present invention, there is provided a computer system, has a processing device; a cache memory; a flash memory for data via the cache memory to be written in response to a request from the processing device; and a buffer; wherein one entry of the cache memory includes a plurality of sectors and updating is performed in units of a sector; and when writing to the flash memory data of an entry to the cache memory, an updated sector in the cache memory and non-updated sector in the flash memory are combined in the buffer and written to the flash memory after the combining.

Preferably, the system further includes a page buffer storing data of an actual page; wherein one entry of the cache memory includes a plurality of sectors and updating is performed in units of a sector; and when writing to the flash memory data of an entry to the cache memory, an updated sector in the entry in the cache memory and non-updated sector in the flash memory are combined in the page buffer and written to the flash memory after the combining.

According to a third aspect of an embodiment of the present invention, there is provided a computer system, having: a processing device; a cache memory; a flash memory for data via the cache memory to be written in response to a request from the processing device; and a page buffer; wherein the computer system has a function part temporarily storing in the page buffer continuous data in an amount of a multiple of a line size of an entry to the cache memory and simultaneously writing it to the flash memory.

BRIEF DESCRIPTION OF THE DRAWING

These and other objects and features of the present invention will become clearer from the following description of the preferred embodiments given with reference to the attached drawings, in which.

DESCRIPTION OF THE PREFERRED EMBODIMENT

Below, embodiments of the present invention will be explained with reference to the drawings.

Figure 1:
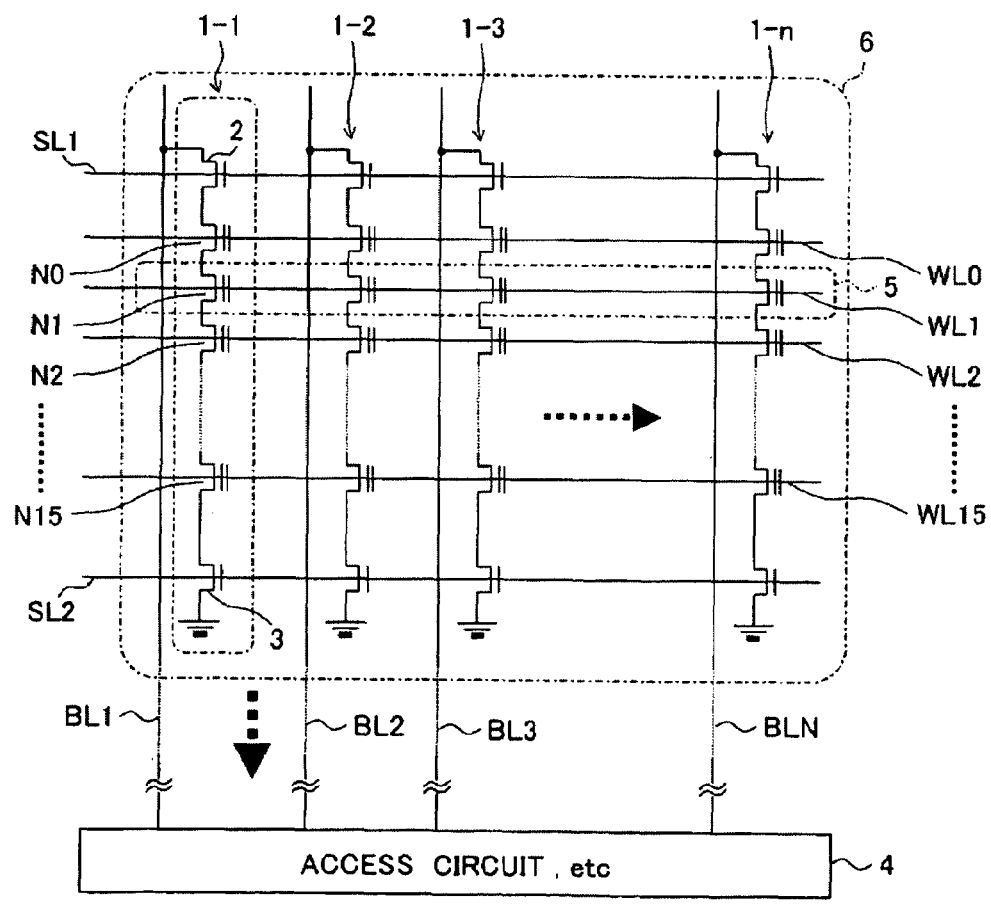
FIG. 1 is a view of an example of the internal configuration of a NAND-type flash memory.
Figure 2:
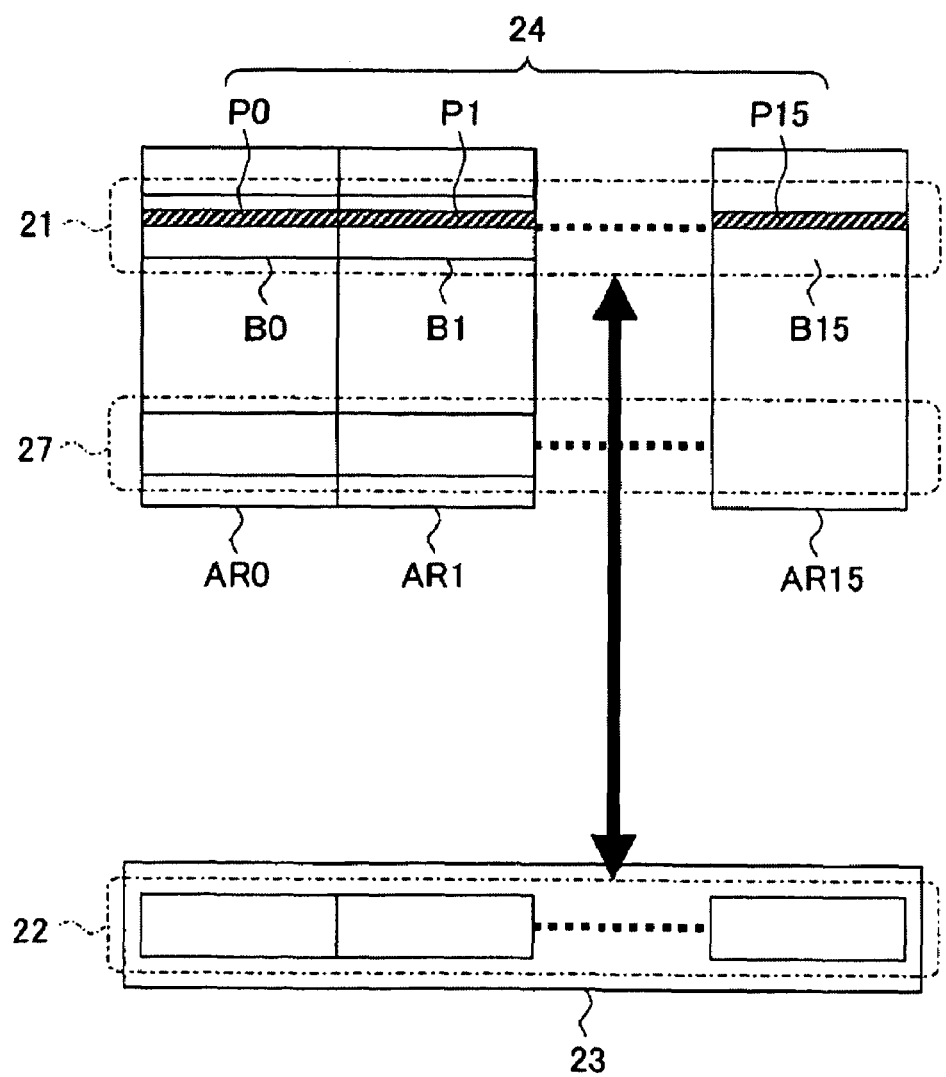
FIG. 2 is a conceptual view of a flash memory configuring a storage device.
Figure 3:
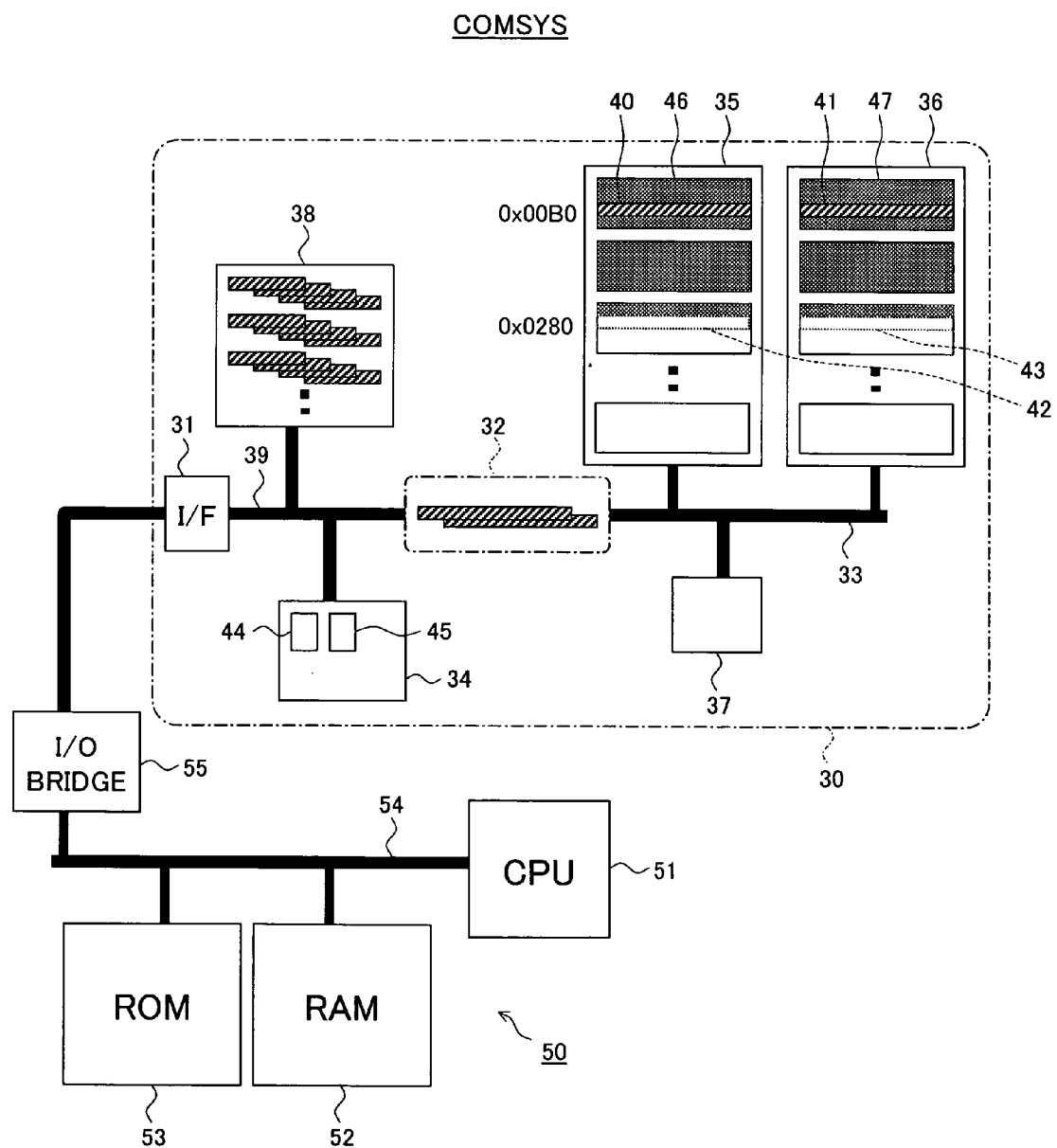
FIG. 3 is a view of the configuration of a computer system according to an embodiment of the present invention.

FIG. 3 is a view of the configuration of a computer system according to the present embodiment.

The computer system "COMSYS" includes a file storage device 30 and a processing device 50 as principal components.

The file storage device 30 is configured to include an interface circuit (I/F) 31, a page buffer 32, a memory bus 33, a control circuit 34, a NAND type flash memories 35 and 36, a control circuit 37, a cache memory 38, and an internal bus 39. Note that reference numbers 40 to 43 indicate page regions. The control circuit 34 includes an address conversion table 44 and a cache management table 45.

The processing device 50 is configured to include a CPU (central processing unit) 51, a RAM (random access memory) 52, a ROM (read-only memory) 53, a system bus 54, and a bridge circuit 55.

The computer system "COMSYS" is controlled by the CPU 51, and the system bus 54 is connected to the RAM 52 and the ROM 53 storing a program.

Also, the file storage device 30 is connected to the CPU 51 via the bridge circuit 55.

The CPU 51 creates a file from various data built in the RAM 52 and stores the same in the file storage device 30 on a timely basis. At that time, a command from the CPU 51 and data are transferred to the file storage device 30 via the bridge circuit 55.

In the file storage device 30, two-chip NAND type flash memories 35 and 36 having an input/output of 16 bits are connected in parallel to the 32-bit memory bus 33. The two-chip NAND type flash memories 35 and 36 are accessed in parallel at a time when reading and writing.

Each of the flash memories 35 and 36 makes the writing or reading access in units of, for example, a 4-kB page unit.

Accordingly, 8 kB is simultaneously accessed as an actual page size.

The page buffer 32 is a page buffer for temporarily storing data of an accessed page region.

Transmitting and receiving of Data between the flash memories 35, 36 and the page buffer 32 are controlled by the control circuit 37.

Furthermore, the control circuit 37 performs error correction by ECC (error-correcting code) encoding on transfer data in accordance with need and manages a defective block in the flash memory. Both of the flash memories 35 and 36 exchange data with the internal bus 39 of the file storage device 30 via the page buffer 32.

Furthermore, the internal bus 39 is connected to the cache memory 38 for writing, the interface circuit 31 of the file storage device 30, and the control circuit 34.

The interface circuit 31 transmits/receives data and commands with the bridge circuit 54 based on the ATA (advanced technology attachment) or PCI (peripheral component interconnect) express or other standard.

The control circuit 34 manages data transfer among the page buffer 32, the cache memory 38 and the interface circuit 31 inside the file storage device 30. In the RAM incorporated therein, the address conversion table 44 for managing virtual addresses in units of page and the management table 45 of the cache memory 38 are formed.

In the file storage device 30, an access to the flash memories 35 and 36 is made as below.

Here, for simplification, addresses in the hexadecimal system are assumed to be assigned as below.

For example, when an externally input address is "0x5500C", the higher 16 bits "0x5500" indicate a page address, the lower 4 bits "0xC" indicate a sector address in the page region, one page includes 16 sectors. A random access in units of one sector can be made to the file storage device 30.

An entry to the cache memory 38 is not made by caching an actual page as it is as in a general cache memory but by caching ¼ of the actual page, that is, in units of 4 sectors.

Accordingly, each entry is managed by being assigned higher 2 bits in the 4-bit sector address in addition to corresponding 16-bit page address.

In the above example, an actual page size is 8 kB, so that a size of one entry is 2 kB. For example, when using a 128-kB RAM as a cache memory, it is possible to have about 64 entries.

Note that if an entry is made in units of an actual page as in a general cache memory, only 16 entries are stored in the same RAM capacity. Alternately, when an entry is made in units of an erase block, it is significant to note that not even one entry is stored in that RAM capacity.

Figure 4:
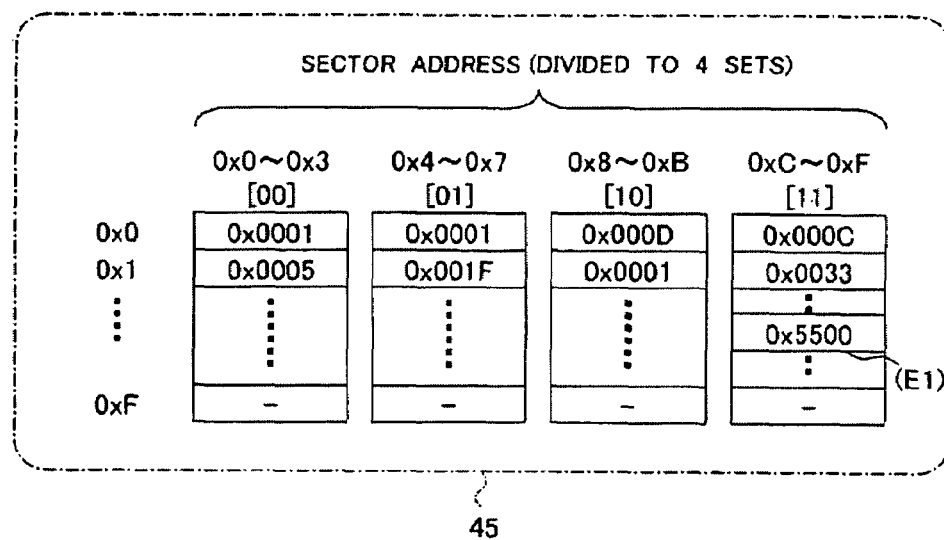
FIG. 4 is a view of a configuration example of a management table of a cache memory according to a first embodiment of the present invention.

FIG. 4 is a view of a configuration example of the cache memory management table 45.

Here, in consideration of easiness of table management and the hit rate, higher two bits of a sector address in a page is used as an index, and four sets were formed. Each set has 16 entries separately. Namely, 4-set 16-way set associative structure is applied. When an entry exists in each field of the table, a page address corresponding to the entry is stored therein.

For example, when an access to a sector at the address "0x5500C" is required from the outside, higher two bits "0xC" of the sector address are used as the index, and a set corresponding to "11" is selected.

Furthermore, the maximum of 16 entries registered to the set are searched, and existence of an entry corresponding to the page address "0x5500" is determined.

Note that as modification of the set associative structure as above, a part of the page address may be added to the index of the set.

For example, the lowermost bit of a logic page address is added to the index, and even pages and odd pages are made to be different sets.

Furthermore, by dividing each page into four in the same way as in the above example, 8 sets are formed. At this time, since the entry size does not change, the number of entries in each set becomes 8 when the cache capacity is the same. Namely, 8-set 8-way set associative is formed.

As explained above, when the entry size is divided to 1/N (N is 2 or larger integer) of the actual page size, the number of sets becomes N or an integral multiple of N.

Furthermore, when it is made to correspond to general address bits in binary, N is power of two. Also, the number of sets is N or (N×M), and M is also power of two.

Furthermore, in the present embodiment, virtual address management in units of page is applied.

Figure 5:
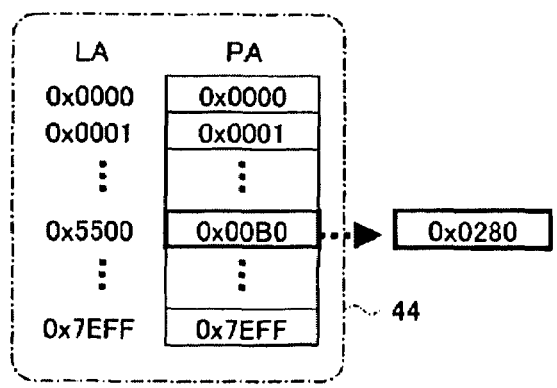
FIG. 5 is a view of a configuration example of an address conversion table.

FIG. 5 is a view of a configuration example of the address conversion table 44.

An access to the flash memory is made as below.

At the time of reading, when a sector address "0x5500C" is input from the outside, the control circuit 34 first determines an existence of a hit from the cache management table 45. When the cache hits, data is read from the cache memory 38.

While, in the case of mishit, the control circuit 34 reads corresponding actual page from the flash memories 35 and 36 to the page buffer 32 by the following procedure.

First, in response to the page address "0x5500C", an access is made to the built-in RAM, and a physical page address (PA: physical address) "0x00B0" corresponding to the logic page address (LA: logical address) "0x5500" is obtained from the address conversion table 44.

The higher "0x00" in the physical page address PA is an address of erase blocks 46 and 47 in the memory chip, that is, the flash memories 35 and 36.

The lower "0xB0" is an address of page regions 40 and 41 in each erase block. Based on the physical address, accesses are made to the flash memories 35 and 36 as a memory chip, data in the page regions 40 and 41 stored at the page address "0x00B0" is respectively read and stored in the page buffer 32.

The interface circuit 31 selects a sector corresponding to the lower address "0xC" from the read data and outputs to the outside.

Figure 6:
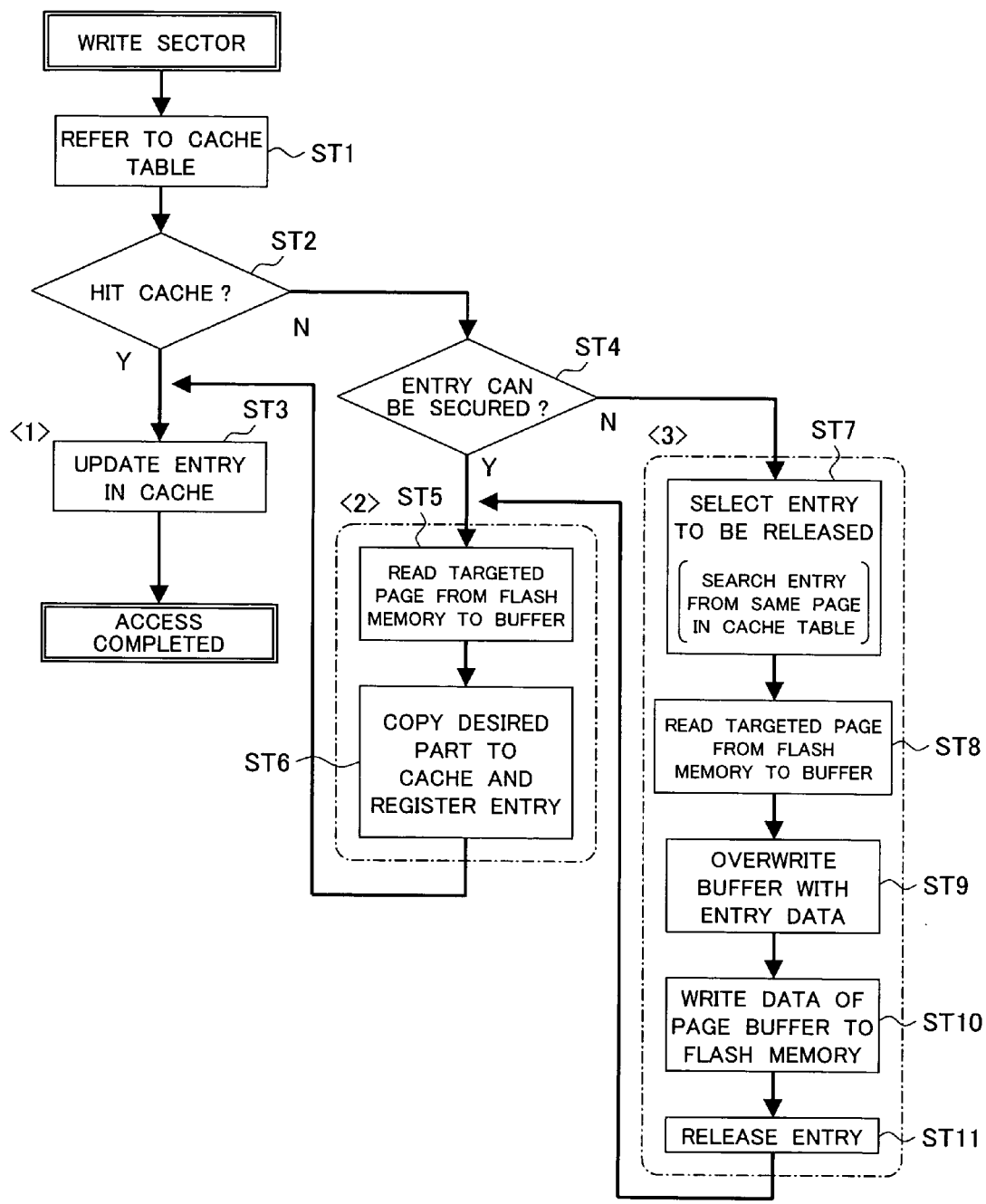
FIG. 6 is a flowchart of a processing procedure when writing to a sector in the first embodiment.

On the other hand, when writing to a sector from the outside, processing as shown in FIG. 6 is performed.

[1] Update of Entry in Cache

The control circuit 34 determines an existence of hit from the management table (hereinafter, referred to as a cache table) 45 of the cache memory 38 (ST1 and ST2). When the cache hits, data is written into the cache memory 38 by updating the entry (ST3).

[2] Generation of Entry

While, in the case of mishit (ST2), if a new entry can be secured in the cache (ST4), an entry is generated by the procedure below.

Namely, a corresponding actual page is read from the flash memories 35 and 36 to the page buffer 32 by the same procedure as that in the case of reading (ST5), a region including the corresponding sector (in an amount of 4 sectors) is cut from that and copied to a data region of the new entry secured in the cache memory 38 (ST6).

Finally, the cache table is updated, and the entry is registered (ST6). After that, a predetermined part in the entry is updated according to the input data (ST3).

[3] Release of Entry

When all entries in the cache memory 38 are filled and a new entry cannot be secured (ST4), a suitable entry is written back to the flash memory for releasing (ST7). For example, when releasing entries (E1 in FIG. 4) corresponding to the logical address "0x5500C" to "x5500F" are released and the data is written back to the flash memory, the following procedure is used.

First, the address conversion table 44 is referred to in the same procedure as that in the case of reading, and data of the page regions 40 and 41 is read from the memory chip, that is, the flash memories 35 and 36 and stored in the page buffer 32 (ST8).

A corresponding entry part is selected from that and updated by overwriting data in the entry to be released in the cache memory (ST9).

Note that, in the cache table 45 at that time, other set not including the release entry (E1), that is, when an entry from the same page "0x5500" in sets of "00", "01" and "10" exists, they are preferably written back at the same time. Furthermore, the entries may be also released at the same time.

For example, in the case where an access from a host is made in large units of 4 kB or 8 kB, writing to the flash memory is performed in small segments due to the entry made by dividing the actual page and the access frequency increases, which is disadvantageous.

The disadvantage can be solved by writing back a plurality of entries at a time as explained above, because a step of writing back to the flash memory, which takes the longest time in an access to the storage device, is performed efficiently.

When data in the page buffer 32 is updated as explained above, it is written back to the flash memories 35 and 36. Finally, the cache table 45 is updated.

Furthermore, when writing back to the flash memories in the cache configuration as above, the additional rewriting as below is preferably applied.

Namely, when writing back updated page data to the flash memories 35 and 36, it is written in respective space regions 42 and 43 (ST10 and ST11). A physical page address of the page field is "0x0280", which corresponds to a page at "0x80" in an erase block "0x02".

Also, until this processing, the space regions were unused free page not registered to any of physical address regions in the address conversion table 44. Updated data is written to the spaces by adding thereto, and the physical address "0x0280" of the space regions 42 and 43 is registered to the physical address region corresponding to the logical address "0x5500" in the address conversion table 44.

Namely, in the present embodiment, writing back of actual page data to the flash memories is performed by adding the updated page data to regions subjected to erasing and invalidating the original page fields.

By using the method as above, data saving of original blocks, etc. becomes unnecessary at the time of writing back, and an access can be made to the flash memories in units of only an actual page. When an entry is made by dividing an actual page as in the present embodiment, writing back to the flash memories is preferably performed also in units of an actual page for improving an efficiency of the memory system.

Accordingly, rewriting by adding in units of an actual page as explained above is preferable in the present invention.

Note that, in the present embodiment, an example considered to be preferable as a general system configuration was explained.

The feature of the embodiment of the present invention is to divide a line size of an entry to the cache memory to 1/N (N is 2 or larger integer) of an actual page size, but by making the cache configuration a set associative formed by sets in an amount of N or an integral multiple of N, effective management becomes possible while securing a high hit rate.

Also, by applying writing by adding in units of an actual page at the time of writing back to the flash memories, particularly notable cumbersomeness at the time of writing back can be widely reduced due to the present cache configuration.

Note that an actual page mentioned here indicates a basic unit of continuous data simultaneously written to the flash memories and, when it is formed by a page group from a plurality of devices, there may be a variety of forms of setting timings of data transfer to respective devices and writing. For example, data may be transferred to a device while writing to other device is performed, or writing operations in a plurality of devices may start at the same time. Namely, when assuming that the plurality of devices are substantially one flash storage device, a basic unit of simultaneous writing is an actual page.

Note that when composing an actual page by a plurality of flash storage devices to attain a high-speed operation by internal parallel processing, the configuration of temporarily storing an actual page in the page buffer and performing simultaneous writing to the flash storage devices via the buffer as in the present embodiment is convenient in terms of handleability.

To explain from other point of view, continuous data in an amount of a multiple of an entry size of the cache memory is temporarily stored in the page buffer and simultaneously written to the flash memories in the embodiment of the present invention.

Also, the cache configuration in the present embodiment can be applied to other variety of cases. For example, the cache memory may be configured to be full associative. In this case, 64 random entries can be formed in the above example, but all of them are searched when determining a hit.

Also, when writing back to the flash memories, a management method in units of a block may be used in the same way as in a general cache memory.

In that case, in an example in FIG. 3, rewriting of the page regions 40 and 41 is preformed by moving all pages in an erase block including them. Namely, pages in the erase block at a physical address "0x00" are copied to an auxiliary erase block in an amount of one page at a time successively via the page buffer 32.

In that step, when data in the page regions 40 and 41 are stored in the page buffer 32, it is overwritten by update data. When all pages are moved, the original block is erased to be a auxiliary block.

Also, in the present embodiment, the cache memory 38 was managed on the file storage device 30 side by using the control circuit 34 separately from the CPU of the processing device 50 on the host side.

However, it is also possible, for example, to provide a similar cache region in a part of the RAM 52 as the system memory and manage the same on the host side.

Also, a flash memory is often added parity bits for error correction in units of page and, in addition to that, often added unique management auxiliary data for each storage device.

For example, when processing of encoding and decoding for error correction is performed at a connection part of the page buffer 32 and the internal bus 39, a line size of an entry to the cache memory does not always become precisely 1/N of an actual page size even if the present embodiment is applied.

However, an expression of 1/N here is a net data amount excluding management data added uniquely by such file storage devices, so that the variation as above is within the scope of the embodiment of the present invention.

In the first embodiment explained above, when generating a cache entry in the [2] processing in FIG. 6, reading of a corresponding page from the flash memories is performed first. When an actual page size becomes large, this transfer time also becomes a factor of deteriorating the access performance.

Particularly when making an entry by dividing a page, even if an access from the host is made in large units of 4 kB or 8 kB, the entry is generated to be small segments, so that a reading step is performed every time. Namely, there arises a case of reading the same page redundantly for many times.

On the other hand, a second embodiment of the present invention proposes a new method, wherein reading of original data from the flash memory becomes unnecessary when generating an entry to the cache memory.

Figure 7:
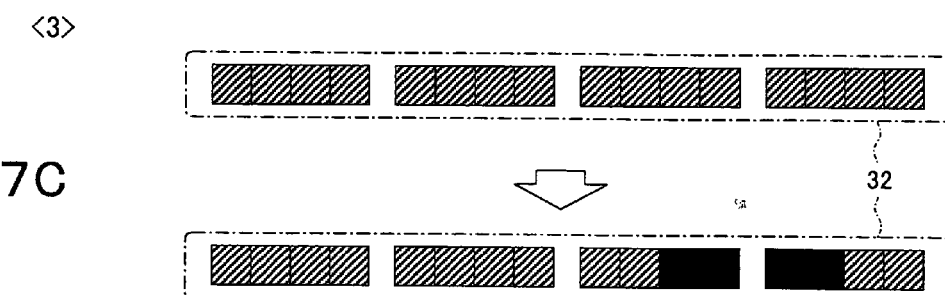
FIG. 7 is a view of an example of a cache table (management table) according to a second embodiment of the present invention.
Figure 8:
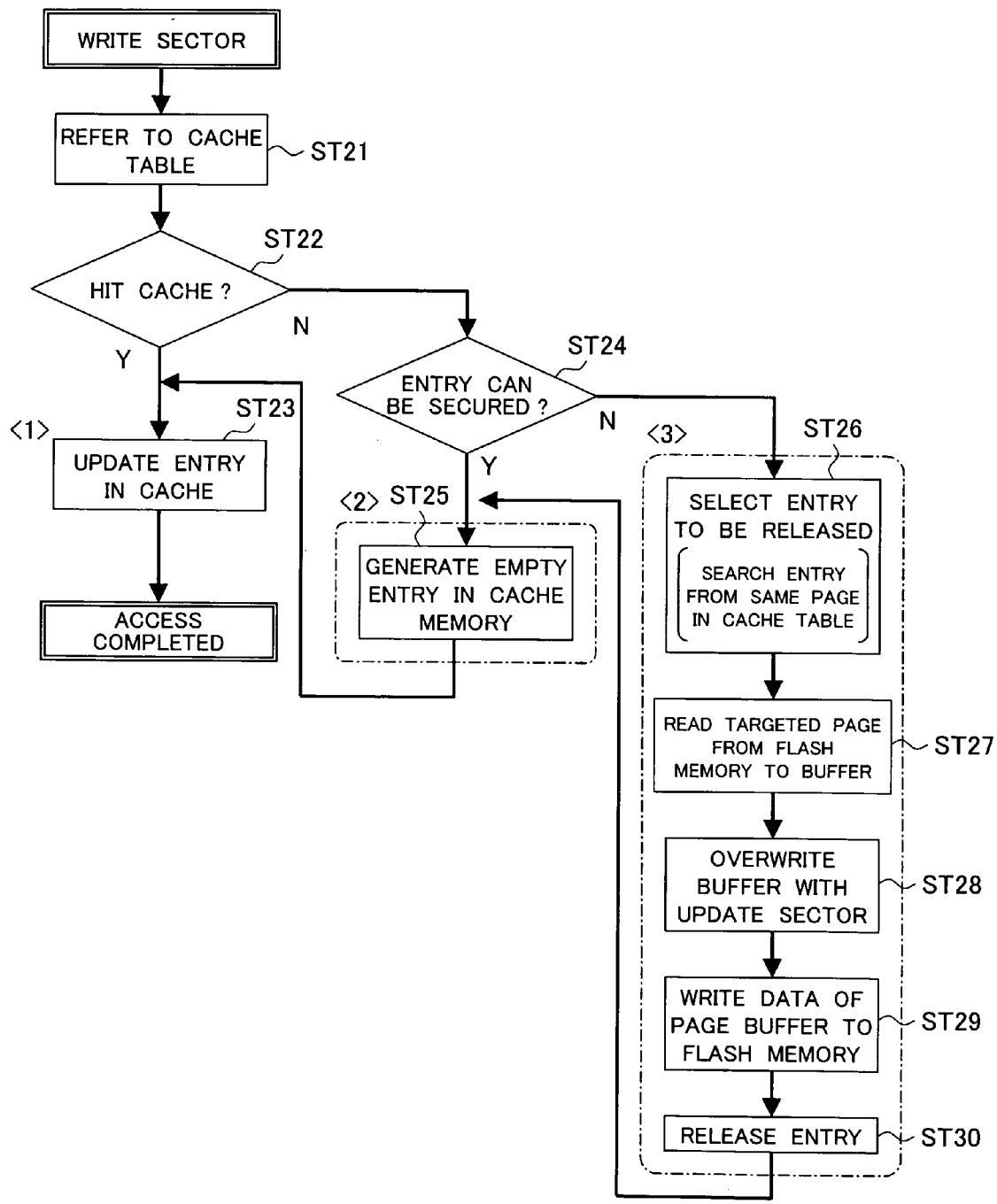
FIG. 8 is a flowchart of a processing procedure when writing to a sector in the second embodiment.

FIG. 7 is a view of an example of a cache table (management table) according to the second embodiment of the present invention. Also, FIG. 8 is a flowchart of a processing procedure of writing a sector in the second embodiment.

Note that the configuration of the system itself is the same as that in FIG. 3.

The cache table (management table) according to the second embodiment of the present invention uses the same set associative as that in the cache table (FIG. 4) in the first embodiment, and a different point is that each entry is added a flag field for indicating an existence of writing in each sector.

Caching is managed by the procedure below.

Processing [1] in FIG. 7A:

First, it is assumed that writing is performed to a sector address "0x00014" in the storage device. At this time, a memory region (2 kB) in an amount of 4 sectors is secured as an entry for data at a corresponding set "01" (corresponding to sector addresses "0x4 to 0x7") in the cache memory 38, and an empty entry is generated.

At this time, in a corresponding entry field 60 in the cache table shown in FIG. 7A, a flag field for indicating whether writing is performed in each sector is generated in addition to a field for storing the page address "0x0001".

After that, data is written in the first one sector of the entry. At this time, "1" is put at a corresponding position of the sector writing flag in the field 60 in the cache table.

Note that other sector fields in the same entry are not filled with data read from the flash memories being different from the previous cases and remain empty. As a result, each entry in the cache memory is left incomplete and unwritten sectors can be determined by referring to the flag.

Processing [2] in FIG. 7B:

After that, it is assumed that sectors at "0x00015" to "0x00019" are written successively and, furthermore, sectors "0x000AA" to "0x000AD" are written.

During that time, memory for entry data is secured without reading data form the flash memories, and "1" is put as a flag for sectors, to which data is actually written.

Processing [3] in FIG. 7C:

From the above state, when writing back entries 61 and 62 relating to a page at "0x000A" to release them, it is performed as below.

First, an actual page corresponding to a logical address "0x000A" is read from the flash memories 35 and 36 and transferred to the page buffer 32 shown in FIG. 3.

At this time, the address conversion table 44 may be referred to in accordance with need to convert it to a physical page address PA for making an access to the flash memories.

Next, a flag of the entries 61 and 62 is referred to, and only sector data in regions with a flag "1" is transferred from the cache memory 38 to the page buffer 32 for overwriting. As a result, original page data on the flash memory side and data in input (update) sector accumulated in the cache are combined in the page buffer, so that complete page data is formed.

Finally, data in the page buffer 32 is written back to the flash memories.

FIG. 8 shows the steps of writing sectors in a processing flow from steps ST21 to ST30.

By applying the above steps, reading of an original page from the flash memories becomes unnecessary when generating an entry.

When comparing with the flowchart in FIG. 6 of the first embodiment, in the entry generating step [2] (ST5 and ST6), only an empty entry for the cache memory is generated (ST25) and the operation is completed instantaneously.

A point for realizing it is to generate complete page data by selectively combining only update sector in the entry and data of the original page in the page buffer 32 when writing back to the flash memories at the time of entry releasing in the processing [3].

For that purpose, information for determining an existence of update in each sector in the entry is necessary, and it was attained by indicating update of sectors in each entry by a flag in the cache table in the example in FIG. 7 explained above.

On the other hand, storing of such information in a variety of forms may be considered other than the flag in the table. For example, a header may be added to each sector data as a mark of being valid or invalid, or validity or invalidity of each sector inside may be simultaneously indicated at a header of each entry data. The present invention may be applied regardless of the storing forms of such sector update information.

Also, the first embodiment and the second embodiment of the present invention may be performed separately, and the effects can be respectively obtained. However, by combining the both, the most efficient cache memory can be configured.

Namely, in the first embodiment for generating an entry by dividing an actual page to small segments, there may arise redundancy of reading the same actual page for many times from the flash memories when generating an entry, while in the second embodiment, reading of an actual page from the flash memories itself is unnecessary, so that the above disadvantage is solved fundamentally.

Note that an SRAM (static random access memory), DRAM (dynamic random access memory) and other volatile RAM may be used as the cache memory, but when the cache memory is included in a mobile media, resistance to temporary power down caused by abrupt ejection, etc. is preferably given. Also, even in the case of an incorporated medium, it should be prepared to temporary power down of the computer device itself.

Accordingly, it is preferable that a ferroelectric memory or other non-volatile RAM is used as the cache memory and, furthermore, the cache table and the address conversion table are stored in such a non-volatile RAM.

Figure 9:
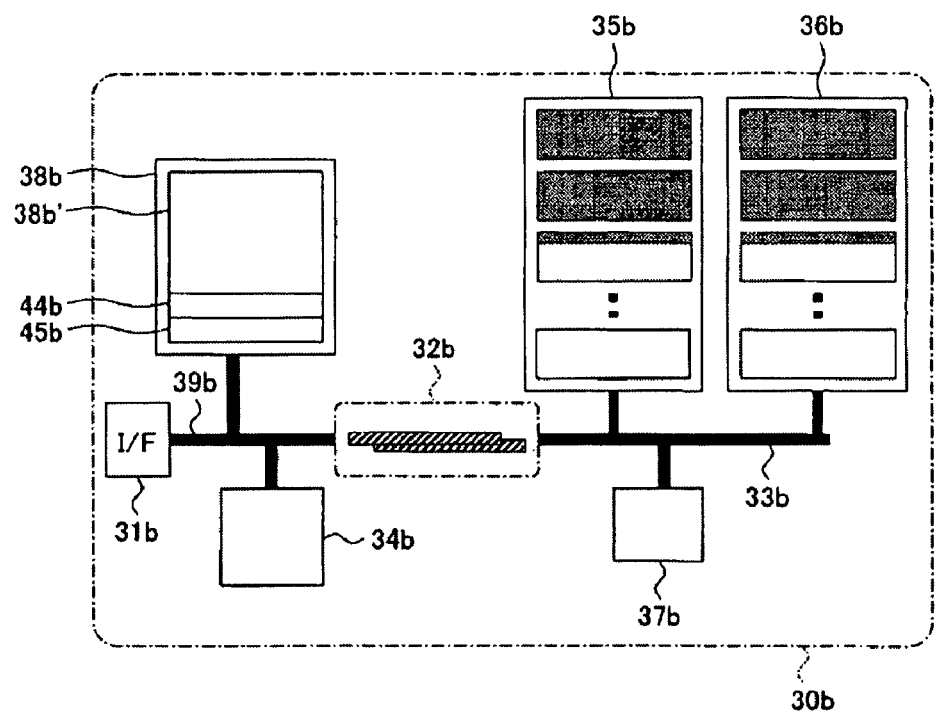
FIG. 9 is a view of a configuration example of a file storage device, wherein the configuration using a non-volatile RAM, such as a ferroelectric memory, is applied as the cache memory.

FIG. 9 is a view of a configuration example of a file storage device, wherein the configuration using a non-volatile RAM, such as a ferroelectric memory, as the cache memory is applied.

Inside a file storage device 30*b* in FIG. 9, two-chip NAND type flash memories 35*b* and 36*b* having 16-bit input/output are connected in parallel to a 32-bit memory bus 33*b*.

When reading and writing, the two chips are accessed in parallel at the same time. To each of the flash memories 35*b* and 36*b*, accesses of writing and reading are made, for example, in units of 4-kB page. Accordingly, 8 kB is accessed at a time as an actual page size.

A page buffer 32*b* temporarily stores data in a page field to be accessed.

Transmitting and receiving of data among the flash memories 35*b* and 36*b* and the page buffer 32*b* are controlled by a control circuit 37*b*.

Furthermore, the control circuit 37*b* performs error correction by ECC encoding on transfer data in accordance with need and manages a defective block in the flash memories. Both of the flash memories 35*b* and 36*b* input/output data between a file storage device 30*b* and an internal bus 39*b* via the page buffer 32*b*.

Furthermore, the internal bus 39*b* is connected to the ferroelectric memory 38*b* composing the cache memory, an interface circuit (I/F) 31*b* of the file storage device, and the control circuit 34*b*.

The interface circuit 31*b* transmits/receives data and commands to and from the host based on the standard of ATA and PCI express, etc.

Inside the ferroelectric memory 38*b*, the cache memory 38*b*' using 1/N (N is 2 or larger integer) of an actual page size as an entry as explained above, an address conversion table 44*b* for managing virtual addresses in units of a page, and a management table 45*b* of the cache memory are provided.

The control circuit 34*b* manages the page buffer 32*b* inside the file storage device 30*b* and data transmitting and receiving between the cache memory 38*b* and the interface circuit 31*b*.

Alternately, the cache memory 38 and the control circuit 34 in FIG. 3 or the memory 38*b* and the control circuit 34*b* in FIG. 9 may be produced at the same time to be integrated to one IC chip.

Furthermore preferably, the interface circuit 31, the page buffer 32 and the control circuit 37 are integrated on the same IC chip, and the file storage device 30 is formed to be a SIP (system in package) of the IC chip and flash memories.

Note that, as the non-volatile RAM, a FeRAM (ferroelectric RAM) using a ferroelectric film, an MRAM (magnetic RAM) using a ferromagnetic material, an OUM (ovonic unified memory) using a phase change material, and an RRAM, etc. are proposed.

The FeRAM is a semiconductor memory for storing data by using difference of polarity directions of ferroelectric capacitors. For example, a form thereof is proposed by S. Sheffeield, et al. in the U.S. Pat. No. 4,873,664.

The MRAM is a semiconductor memory for storing data by using difference of spinning directions of a ferromagnetic film. For example, R. Scheuerlein, et al. disclose an article in the paper digest of ISSCC2000, page 128.

The OUM is a semiconductor memory for storing data by using phase transition of, for example, a chalcogenide film. For example, S. Lai, et al. disclose an article in the paper digests of IEDM2001, page 803.

The RRAM is a semiconductor memory for storing data by using resistance hysteresis of a magnetoresistor. For example, W. W. Zhuang, et al. disclose an article in the paper digest 7.5 of IEDM2002.

All of these non-volatile memories exhibit much higher performance comparing with flash memories in an access speed and the number of rewriting at the cell level.

As explained above, according to the embodiments of the present invention, a new cache configuration is provided, wherein an entry to the cache memory is smaller than an actual page size as a simultaneous accessing unit. Specifically, a line size as an entry is 1/N (N is an integer) of the actual page size, and data transaction between the cache memory and the flash memory is performed via the page buffer.

Namely, according to the embodiments of the present invention, a cache memory having a high hit rate even in a small capacity and less overhead in accessing is given to a storage device using a flash memory as its main medium, writing to the flash memory becomes high in speed and the number of rewriting times is also reduced.

In the system as explained above, it is possible to use a flash memory as if it is a high-speed hard disk, and a compact and high-speed storage system with a low power consumption at standby is obtained.

It should be understood by those skilled in the art that various modifications, combinations, sub-combinations and alternations may occur depending on design requirements and other factors insofar as they are within the scope of the appended claims or the equivalents thereof.

What is claimed is:

1. A computer system, comprising:
   a processing device;
   a cache memory; and
   a flash memory for data via the cache memory to be written in response to a request from the processing device;
   wherein a line size of an entry to the cache memory is 1/N (where N is integer of 2 or larger) of an actual page size as a collective writing unit of the flash memory.

2. A computer system as set forth in claim 1, further including a page a page buffer storing data of an actual page; wherein
   when writing to the flash memory data of an entry to the cache memory, an entry part in the cache memory and a non-entry part in the flash memory in actual page data corresponding to the entry are combined in the page buffer and written to the flash memory after the combining.

3. A computer system as set forth in claim 2, wherein the cache memory has a set associative structure, and the number of sets is N or an integral multiple of N.

4. A computer system as set forth in claim 2, having a function part writing back at least two of entries at a time to the flash memory when there are a plurality of entries corresponding to different regions on the same actual page in the cache memory.

5. A computer system as set forth in claim 2, wherein the flash memory is written back of actual page data performed by adding updated page data to a region subjected to erasing and invalidating an original page field.

6. A computer system, comprising:
   a processing device;
   a cache memory;
   a flash memory for data via the cache memory to be written in response to a request from the processing device; and
   a buffer;
   wherein one entry of the cache memory includes a plurality of sectors and updating is performed in units of a sector; and
   when writing to the flash memory data of an entry to the cache memory, an updated sector in the cache memory and non-updated sector in the flash memory are combined in the buffer and written to the flash memory after the combining.

7. A computer system as set forth in claim 6, further including a page buffer storing data of an actual page; wherein
   one entry of the cache memory includes a plurality of sectors and updating is performed in units of a sector; and
   when writing to the flash memory data of an entry to the cache memory, an updated sector in the entry in the cache memory and non-updated sector in the flash memory are combined in the page buffer and written to the flash memory after the combining.

8. A computer system as set forth in claim 7, wherein a line size of an entry to the cache memory is 1/N (where N is integer of 2 or larger) of an actual page size as a collective writing unit of the flash memory.

9. A computer system as set forth in claim 8, wherein the cache memory has a set associative structure, and the number of sets is N or an integral multiple of N.

10. A computer system as set forth in claim 9, having a function part writing back at least two of entries at a time to the flash memory when there are a plurality of entries corresponding to different regions on the same actual page in the cache memory.

11. A computer system, comprising:
    a processing device;
    a cache memory;
    a flash memory for data via the cache memory to be written in response to a request from the processing device; and
    a page buffer;
    wherein the computer system has a function part temporarily storing in the page buffer continuous data in an amount of a multiple of a line size of an entry to the cache memory and simultaneously writing it to the flash memory.

12. A computer system as set forth in claim 11, wherein
    when writing to the flash memory data of an entry to the cache memory, an entry part in the cache memory and a non-entry part in the flash memory in actual page data corresponding to the entry are combined in the page buffer and written to the flash memory after the combining.

13. A computer system as set forth in claim 12, wherein the cache memory has a set associative structure, and the number of sets is N or an integral multiple of N.

14. A computer system as set forth in claim 13, having a function part writing back at least two of entries at a time to the flash memory when there are a plurality of entries corresponding to different regions on the same actual page in the cache memory.

15. A computer system as set forth in claim 11, wherein a line size of an entry to the cache memory is 1/N (where N is integer of 2 or larger) of an actual page size as a collective writing unit of the flash memory.

* * * * *